US010088597B2

(12) United States Patent
Altman et al.

(10) Patent No.: US 10,088,597 B2
(45) Date of Patent: Oct. 2, 2018

(54) DETERMINING PHASE BEHAVIOR OF A RESERVOIR FLUID

(71) Applicant: Schlumberger Technology Corporation, Sugar Land, TX (US)

(72) Inventors: Raphael Altman, Bogota (CO); Mikhail Stukan, Al-Khobar (SA); Andrew E. Pomerantz, Lexington, MA (US); Albina Mutina, Maturin (VE)

(73) Assignee: Schlumberger Technology Corporation, Sugar Land, TX (US)

(*) Notice: Subject to any disclaimer, the term of this patent is extended or adjusted under 35 U.S.C. 154(b) by 882 days.

(21) Appl. No.: 14/326,370

(22) Filed: Jul. 8, 2014

(65) Prior Publication Data
US 2015/0066464 A1 Mar. 5, 2015

Related U.S. Application Data

(60) Provisional application No. 61/870,782, filed on Aug. 27, 2013.

(51) Int. Cl.
*G01V 99/00* (2009.01)
*G06F 17/30* (2006.01)
(52) U.S. Cl.
CPC .................. *G01V 99/005* (2013.01)
(58) Field of Classification Search
CPC .............. G01V 99/00; G01V 2200/00; G01V 2210/1216; E21B 49/10
See application file for complete search history.

(56) References Cited

U.S. PATENT DOCUMENTS 5,463,549 A   10/1995   Dussan et al.
6,490,916 B1 * 12/2002   Goodwin ............... E21B 34/08
                                                 166/250.01
(Continued)

FOREIGN PATENT DOCUMENTS

EP            656547 A1    6/1995
WO     WO 2011138700 A2 * 11/2011  ............ E21B 49/10

OTHER PUBLICATIONS

Alharthy, "Multiphase Compositional Modeling in Small-Scale Pores of Unconventional Shale Reservoirs", Paper SPE 166306 presented at the SPE Annual Technical Conference and Exhibition, New Orleans, Sep. 30-Oct. 2, 2013, 20 pages.
(Continued)

*Primary Examiner* — Aniss Chad
*Assistant Examiner* — Steven W Crabb
(74) *Attorney, Agent, or Firm* — Colin L. Wier; Gary Gex; Alec McGinn

(57) ABSTRACT

Various implementations directed to determining a phase behavior of a reservoir fluid are provided. In one implementation, a method may include receiving a plurality of predetermined pore size data, a plurality of predetermined bulk fluid data, and a plurality of predetermined kerogen data that are based on historical data for a plurality of hydrocarbon reservoirs. The method may also include creating a library of a plurality of simulated phase behavior data for the predetermined pore size data, the predetermined bulk fluid data, and the predetermined kerogen data. The method may further include determining a phase behavior of a reservoir fluid disposed in an actual hydrocarbon reservoir using the library.

13 Claims, 8 Drawing Sheets

(56) References Cited

U.S. PATENT DOCUMENTS

| | | | |
|---|---|---|---|
| 8,024,164 B1* | 9/2011 | Eryilmaz | G05B 17/02 |
| | | | 703/6 |
| 8,335,650 B2* | 12/2012 | Hsu | E21B 47/10 |
| | | | 166/252.1 |
| 8,996,346 B2* | 3/2015 | Zuo | E21B 47/10 |
| | | | 703/10 |
| 2004/0026076 A1* | 2/2004 | Goodwin | E21B 34/08 |
| | | | 166/66.6 |
| 2004/0104341 A1* | 6/2004 | Betancourt | E21B 47/10 |
| | | | 250/255 |
| 2008/0059140 A1* | 3/2008 | Salmon | E21B 49/00 |
| | | | 703/12 |
| 2009/0235731 A1* | 9/2009 | Zuo | G01N 33/2823 |
| | | | 73/152.28 |
| 2010/0154529 A1 | 6/2010 | Terabayashi et al. | |
| 2010/0155078 A1 | 6/2010 | Walters et al. | |
| 2011/0060572 A1* | 3/2011 | Brown | E21B 43/00 |
| | | | 703/10 |
| 2013/0024122 A1 | 1/2013 | Wang et al. | |
| 2013/0346040 A1* | 12/2013 | Morales German | |
| | | | G06F 17/5009 |
| | | | 703/2 |

OTHER PUBLICATIONS

Ambrose, "Multi-component Sorbed-phase Considerations for Shale Gas-in-place Calculations", Paper SPE 141416 presented at the SPE Production and Operations Symposium, Oklahoma City, Mar. 27-29, 2011, 10 pages.

Ambrose, "New Pore-scale Considerations for Shale Gas in Place Calculations", Paper SPE 131772 presented at the PSE Unconventional Gas Conference, Pittsburgh, Feb. 23-25, 2010, 17 pages.

Devegowda, et al., "Phase Behavior of Gas Condensates in Shales Due to Pore Proximity Effects: Implications for Transport, Reserves and Well Productivity", Paper SPE 160099 presented the SPE Annual Technical Conference and Exhibition, San Antonio, Oct. 8-10, 2012, 22 pages.

Dhanapal, et al., "Phase Behavior and Storage in Organic Shale Nanopores: Modeling of Multicomponent Hydrocarbons in Connected Pore Systems and Implications for Fluid-in-place Estimates in Shale Oil and Gas Reservoirs", Paper SPE 169008 presented at the 2014 SPE Unconventional Resources Conference, Woodlands, Apr. 1-3, 2014, 17 pages.

Didar, et al., "Pore-Size Dependence of Fluid Phase Behavior and Properties in Organic-Rich Shale Reservoirs", Paper SPE 164099 presented at the SPE International Symposium on Oilfield Chemistry, The Woodlands, Apr. 8-10, 2013, 19 pages.

Du, et al., "Understanding Anomalous Phase Behavior in Unconventional Oil Reservoirs", Paper SPE 161830 presented at the Canadian Unconventional Resources Conference, Calgary, Oct. 30-Nov. 1, 2012, 10 pages.

Fan, et al., "Understanding Gas Production Mechanism and Effectiveness of Well Stimulation in the Haynesville Shale through Reservoir Simulation", Paper SPE 136696 presented at the Canadian Unconventional Resources Conference, Calgary, Oct. 19-21, 2010, 15 pages.

Gouth, et al., "Molecular Simulation to Determine Key Shale Gas Parameters, and Their Use in a Commercial Simulator for Production Forecasting", Paper SPE 164790 presented at the EAGE Annual Conference & Exhibition incorporating SPE Europec, London, Jun. 10-13, 2013, 16 pages.

Hartman, et al., "Shale Gas-in-Place Calculations Part II—Multicomponent Gas Adsorption Effects", Paper SPE 144097 presented at the SPE Unconventional Gas Conference, Woodlands, Jun. 14-16, 2011, 17 pages.

Lucena, et al., "Molecular simulation of the accumulation of alkanes from natural gas in carbonaceous materials", Carbon, vol. 61, 2013, pp. 624-632.

Yu, et al., "Simulation of Gas Desorption and Geomechanics Effects for Unconventional Gas Reservoirs", Paper SPE 165377 presented at the SPE Western Regional & AAPG Pacific Section Meeting, Monterey, Apr. 19-25, 2013, 15 pages.

International Search Report and Written Opinion issued in PCT/US2014/051437 dated Nov. 2014, 9 pages.

Extended Search Report for the equivalent European patent application 14839228.5 dated Mar. 29, 2017.

* cited by examiner

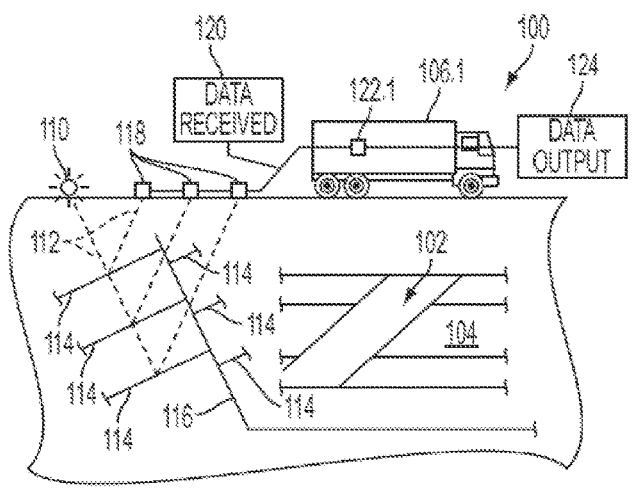
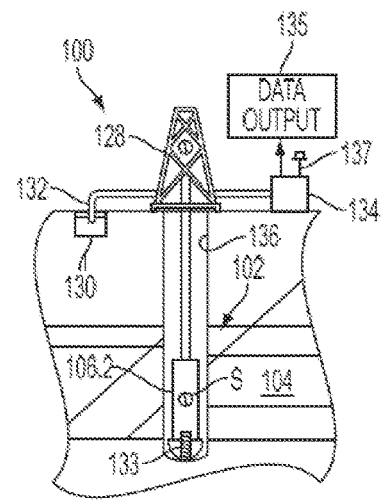
FIG. 1.1  FIG. 1.2
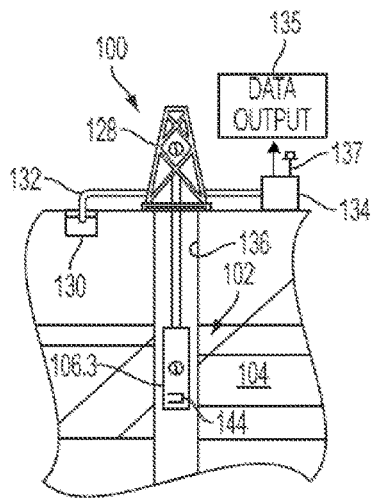
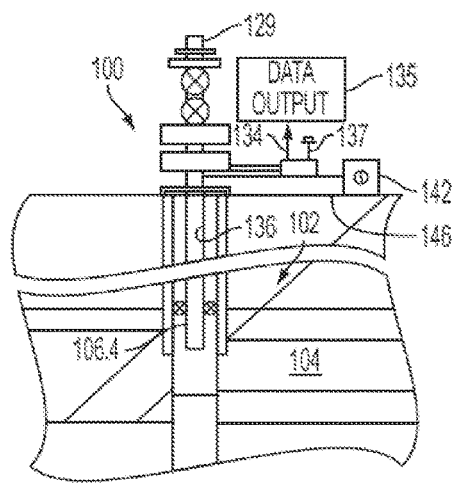
FIG. 1.3  FIG. 1.4

DETERMINING PHASE BEHAVIOR OF A RESERVOIR FLUID

CROSS-REFERENCE TO RELATED APPLICATIONS

This application claims benefit of U.S. provisional patent application Ser. No. 61/870,782, filed Aug. 27, 2013 and titled MECHANISMS OF LIQUID DROP-OUT IN HORIZONTAL GAS CONDENSATE WELLS, the entire disclosure of which is herein incorporated by reference.

BACKGROUND

Operations, such as surveying, drilling, wireline testing, completions, and production, may involve various subsurface activities used to locate and gather hydrocarbons from a subterranean reservoir. One or more oil or gas wells may be positioned in the subterranean reservoir, where the wells may be provided with tools capable of advancing into the ground and removing hydrocarbons from the subterranean reservoir. Production facilities may be positioned at surface locations to collect the hydrocarbons from the wells. In particular, a reservoir fluid containing these hydrocarbons may be drawn from the subterranean reservoir and passed to the production facilities using equipment and other transport mechanisms, such as tubing.

In one scenario, a phase behavior of reservoir fluids may play a role in the producibility of the oil or gas wells. For example, a reservoir fluid produced from an oil well may have hydrocarbon components which exist as a liquid at a temperature and pressure of reservoir rock, yet also have lighter components which may evolve as gas as a wellbore and formation pressure is reduced. This evolution of gas in the reservoir rock may decrease an amount of oil that may be recovered. Similarly, in gas wells, heavier components of gas may begin to condense as a liquid as the gas is produced. However, if liquid were to form in the pore spaces of the gas well, the permeability to gas flow may be reduced, which, in turn, may interfere with gas production. Thus, knowledge of the phase behavior of reservoir fluids may be used to evaluate a production capability of the oil or gas wells.

SUMMARY

Various implementations directed to determining a phase behavior of a reservoir fluid are provided. In one implementation, a method may include receiving a plurality of predetermined pore size data, a plurality of predetermined bulk fluid data, and a plurality of predetermined kerogen data that are based on historical data for a plurality of hydrocarbon reservoirs. The method may also include creating a library of a plurality of simulated phase behavior data for the predetermined pore size data, the predetermined bulk fluid data, and the predetermined kerogen data. The method may further include determining a phase behavior of a reservoir fluid disposed in an actual hydrocarbon reservoir using the library.

In another implementation, a non-transitory computer-readable medium may have stored computer-executable instructions which, when executed by a computer, cause the computer to receive a plurality of predetermined pore size data, a plurality of predetermined bulk fluid data, and a plurality of predetermined kerogen data that are based on historical data for a plurality of hydrocarbon reservoirs. The computer-executable instructions may also cause the computer to create a library of a plurality of simulated phase behavior data for the predetermined pore size data, the predetermined bulk fluid data, and the predetermined kerogen data. The computer-executable instructions may further cause the computer to determine a phase behavior of a reservoir fluid disposed in an actual hydrocarbon reservoir using the library.

In yet another implementation, a computer system may include a processor and a memory, the memory having a plurality of program instructions which, when executed by the processor, cause the processor to receive a plurality of predetermined pore size data, a plurality of predetermined bulk fluid data, and a plurality of predetermined kerogen data that are based on historical data for a plurality of hydrocarbon reservoirs. The plurality of program instructions may also cause the processor to create a library of a plurality of simulated phase behavior data for the predetermined pore size data, the predetermined bulk fluid data, and the predetermined kerogen data. The plurality of program instructions may further cause the processor to determine a phase behavior of a reservoir fluid disposed in an actual hydrocarbon reservoir using the library.

The above referenced summary section is provided to introduce a selection of concepts in a simplified form that are further described below in the detailed description section. The summary is not intended to be used to limit the scope of the claimed subject matter. Furthermore, the claimed subject matter is not limited to implementations that solve any disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various techniques will hereafter be described with reference to the accompanying drawings. It should be understood, however, that the accompanying drawings illustrate the various implementations described herein and are not meant to limit the scope of various techniques described herein.

FIGS. 1.1-1.4 illustrate simplified, schematic views of an oilfield having subterranean formation containing reservoir therein in accordance with implementations of various technologies and techniques described herein.

DETAILED DESCRIPTION

Figure 2:
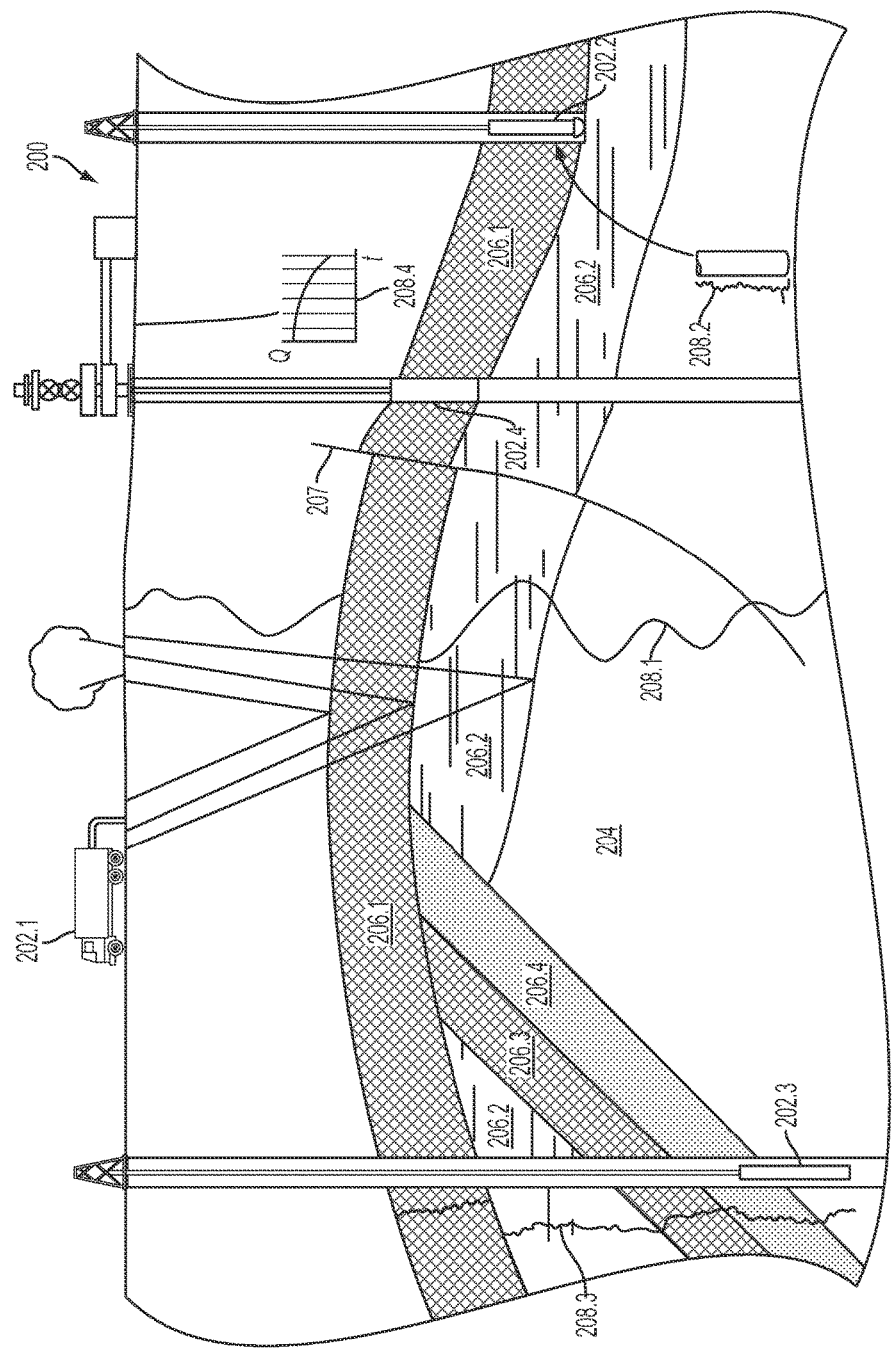
FIG. 2 illustrates a schematic view, partially in cross section of an oilfield having data acquisition tools positioned at various locations along the oilfield for collecting data of a subterranean formation in accordance with implementations of various technologies and techniques described herein.

The discussion below is directed to certain specific implementations. It is to be understood that the discussion below is for the purpose of enabling a person with ordinary skill in the art to make and use any subject matter defined now or later by the patent "claims" found in any issued patent herein.

It is specifically intended that the claims not be limited to the implementations and illustrations contained herein, but include modified forms of those implementations including portions of the implementations and combinations of elements of different implementations as come within the scope of the following claims.

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the claims. The first object and the second object are both objects, respectively, but they are not to be considered the same object.

The terminology used in the description of the present disclosure herein is for the purpose of describing particular implementations and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses one or more possible combinations of one or more of the associated listed items. It will be further understood that the terms "includes" and/or "including," when used in this specification, specify the presence of stated features, integers, operations, elements, and/or components, but do not preclude the presence or addition of one or more other features, integers, operations, elements, components and/or groups thereof.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

It should also be noted that in the development of any such actual implementation, numerous decisions specific to circumstance may be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The terminology and phraseology used herein is solely used for descriptive purposes and should not be construed as limiting in scope. Language such as "having," "containing," or "involving," and variations thereof, is intended to be broad and encompass the subject matter listed thereafter, equivalents, and additional subject matter not recited.

Furthermore, the description and examples are presented solely for the purpose of illustrating the different embodiments, and should not be construed as a limitation to the scope and applicability. While any composition or structure may be described herein as having certain materials, it should be understood that the composition could optionally include two or more different materials. In addition, the composition or structure may also include some components other than the ones already cited. It should also be understood that throughout this specification, when a range is described as being useful, or suitable, or the like, it is intended that any value within the range, including the end points, is to be considered as having been stated. Furthermore, respective numerical values should be read once as modified by the term "about" (unless already expressly so modified) and then read again as not to be so modified unless otherwise stated in context. For example, "a range of from 1 to 10" is to be read as indicating a respective possible number along the continuum between about 1 and about 10. In other words, when a certain range is expressed, even if a few specific data points are explicitly identified or referred to within the range, or even when no data points are referred to within the range, it is to be understood that the inventors appreciate and understand that any data points within the range are to be considered to have been specified, and that the inventors have possession of the entire range and points within the range.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more implementations of various techniques for determining a phase behavior of a reservoir fluid will now be described in more detail with reference to FIGS. 1-7 in the following paragraphs.

Production Environment

FIGS. 1.1-1.4 illustrate simplified, schematic views of a production field 100 having subterranean formation 102 containing reservoir 104 therein in accordance with implementations of various technologies and techniques described herein. The production field 100 may be an oilfield, a gas field, and/or the like. FIG. 1.1 illustrates a survey operation being performed by a survey tool, such as seismic truck 106.1, to measure properties of the subterranean formation 102. The survey operation may be a seismic survey operation for producing sound vibrations. In FIG. 1.1, one such sound vibration, e.g., sound vibration 112 generated by source 110, may reflect off horizons 114 in earth formation 116. A set of sound vibrations may be received by sensors, such as geophone-receivers 118, situated on the earth's surface. The data received 120 may be provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 may be used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling mud. The drilling tools may be advanced into subterranean formations 102 to reach reservoir 104. Each well may target one or more reservoirs. The drilling tools may be adapted for measuring downhole properties using logging while drilling tools. The logging while drilling tools may also be adapted for taking core sample 133 as shown.

Computer facilities may be positioned at various locations about the production field 100 (e.g., the surface unit 134) and/or at remote locations. Surface unit 134 may be used to communicate with the drilling tools and/or offsite operations, as well as with other surface or downhole sensors. Surface unit 134 may be capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about production field 100 to collect data relating to various production field operations as described previously. As shown, sensor (S) may be positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly may include capabilities for measuring, processing, and storing information, as well as communicating with surface unit 134. The bottom hole assembly may further include drill collars for performing various other measurement functions.

The bottom hole assembly may include a communication subassembly that communicates with surface unit 134. The communication subassembly may be adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It may be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the production field 100 or other locations. Surface unit 134 may also be provided with or functionally connected to one or more controllers (not shown) for actuating mechanisms at production field 100. Surface unit 134 may then send command signals to production field 100 in response to data received. Surface unit 134 may receive commands via transceiver 137 or may itself execute commands to the controller. A processor may be provided to analyze the data (locally or remotely), make the decisions and/or actuate the controller. In this manner, production field 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 may be adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about production field 100 to collect data relating to various field operations as described previously. As shown, sensor S may be positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about production field 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure properties of a production field, such as an oilfield or gas field, it may be appreciated that the tools may be used in connection with other operations, such as mines, aquifers, storage, or other subterranean facilities. Also, while certain data acquisition tools are depicted, it may be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 may be an example of a field usable with oilfield or gas field application frameworks. At least part of the production field 100 may be on land, water, and/or sea. Also, while a single field measured at a single location may be depicted, oilfield or gas field applications may be utilized with any combination of one or more oilfields and/or gas field, one or more processing facilities and one or more wellsites.

FIG. 2 illustrates a schematic view, partially in cross section of production field 200 having data acquisition tools 202.1, 202.2, 202.3 and 202.4 positioned at various locations along production field 200 for collecting data of subterranean formation 204 in accordance with implementations of various technologies and techniques described herein. The production field 200 may be an oilfield, a gas field, and/or the like. Data acquisition tools 202.1-202.4 may be the same as data acquisition tools 106.1-106.4 of FIGS. 1.1-1.4, respectively, or others not depicted. As shown, data acquisition tools 202.1-202.4 may generate data plots or measurements 208.1-208.4, respectively. These data plots may be depicted along production field 200 to demonstrate the data generated by the various operations.

Data plots 208.1-208.3 may be examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 may be a seismic two-way response over a period of time. Static plot 208.2 may be core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 may be a logging trace that may provide a resistivity or other measurement of the formation at various depths.

A production decline curve or graph 208.4 may be a dynamic data plot of the fluid flow rate over time. The production decline curve may provide the production rate as a function of time. As the fluid flows through the wellbore, measurements may be taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 may have a plurality of geological formations 206.1-206.4. As shown, this structure may have several formations or layers, including a shale layer 206.1, a carbonate layer 206.2, a shale layer 206.3 and a sand layer 206.4. A fault 207 may extend through the shale layer 206.1 and the carbonate layer 206.2. The static data acquisition tools may be adapted to take measurements and detect characteristics of the formations.

While a specific subterranean formation with specific geological structures is depicted, it may be appreciated that production field 200 may contain a variety of geological structures and/or formations, sometimes having extreme complexity. In some locations, such as below the water line, fluid may occupy pore spaces of the formations. Each of the measurement devices may be used to measure properties of the formations and/or its geological features. While each acquisition tool may be shown as being in specific locations in production field 200, it may be appreciated that one or more types of measurement may be taken at one or more locations across one or more fields or other locations for comparison and/or analysis.

The data collected from various sources, such as the data acquisition tools of FIG. 2, may then be processed and/or evaluated. The seismic data displayed in static data plot 208.1 from data acquisition tool 202.1 may be used by a geophysicist to determine characteristics of the subterranean formations and features. The core data shown in static plot 208.2 and/or log data from well log 208.3 may be used by a geologist to determine various characteristics of the subterranean formation. The production data from graph 208.4 may be used by the reservoir engineer to determine fluid flow reservoir characteristics. The data analyzed by the geologist, geophysicist and the reservoir engineer may be analyzed using modeling techniques.

Figure 3:
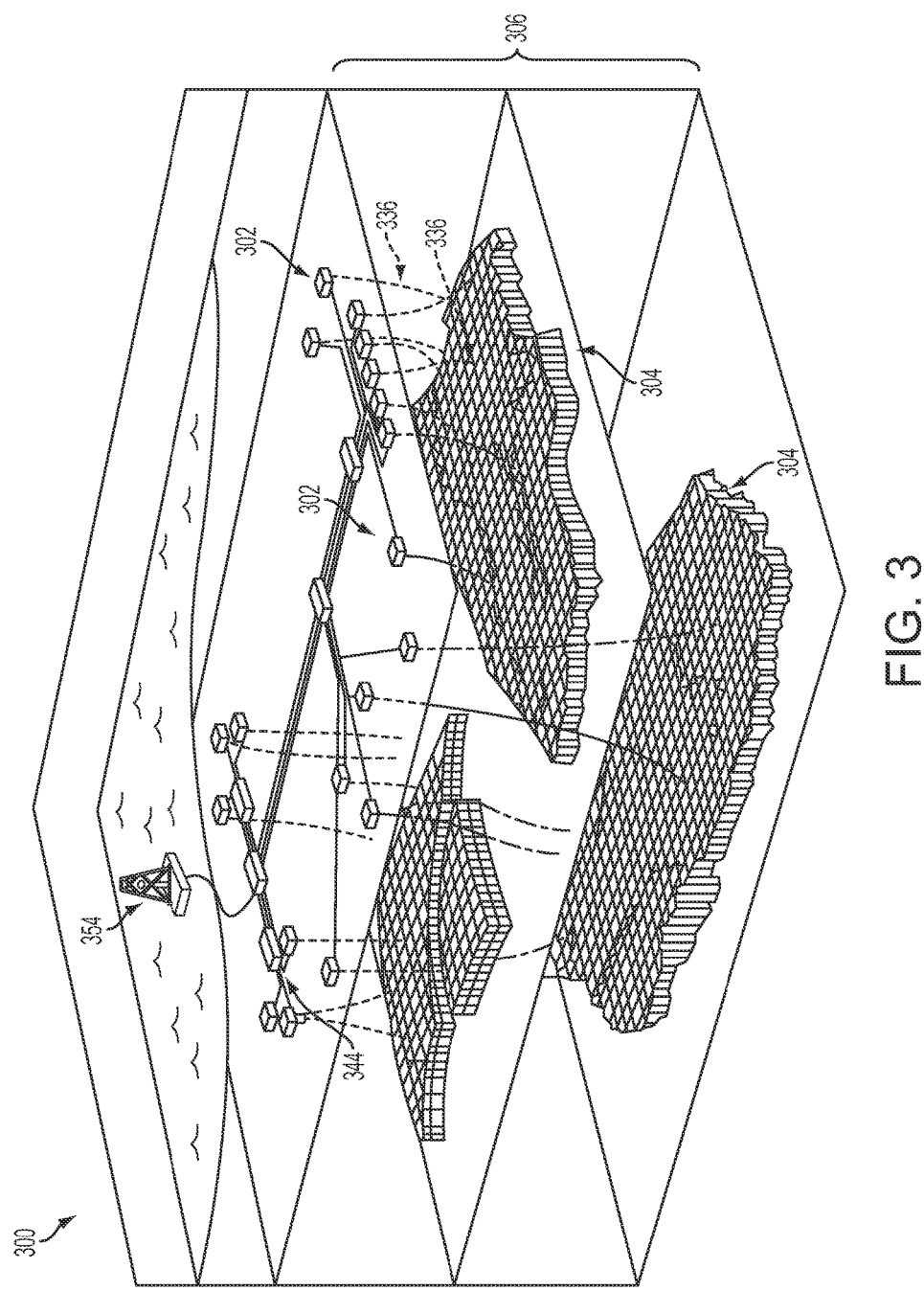
FIG. 3 illustrates an oilfield for performing production operations in accordance with implementations of various technologies and techniques described herein.

FIG. 3 illustrates a production field 300 for performing production operations in accordance with implementations of various technologies and techniques described herein. The production field 300 may be an oilfield, a gas field, and/or the like. As shown, the production field 300 may have a plurality of wellsites 302 operatively connected to central processing facility 354. The production field configuration of FIG. 3 may not be intended to limit the scope of the production field application system. At least part of the production field may be on land and/or sea. Also, while a single production field with a single processing facility and a plurality of wellsites is depicted, any combination of one or more production fields, one or more processing facilities and one or more wellsites may be present.

Each wellsite 302 may have equipment that forms wellbore 336 into the earth. The wellbores may extend through subterranean formations 306 including reservoirs 304. These reservoirs 304 may contain fluids, such as hydrocarbons. The wellsites may draw fluid from the reservoirs and pass them to the processing facilities via surface networks 344. The surface networks 344 may have tubing and control mechanisms for controlling the flow of fluids from the wellsite to processing facility 354.

Figure 4:
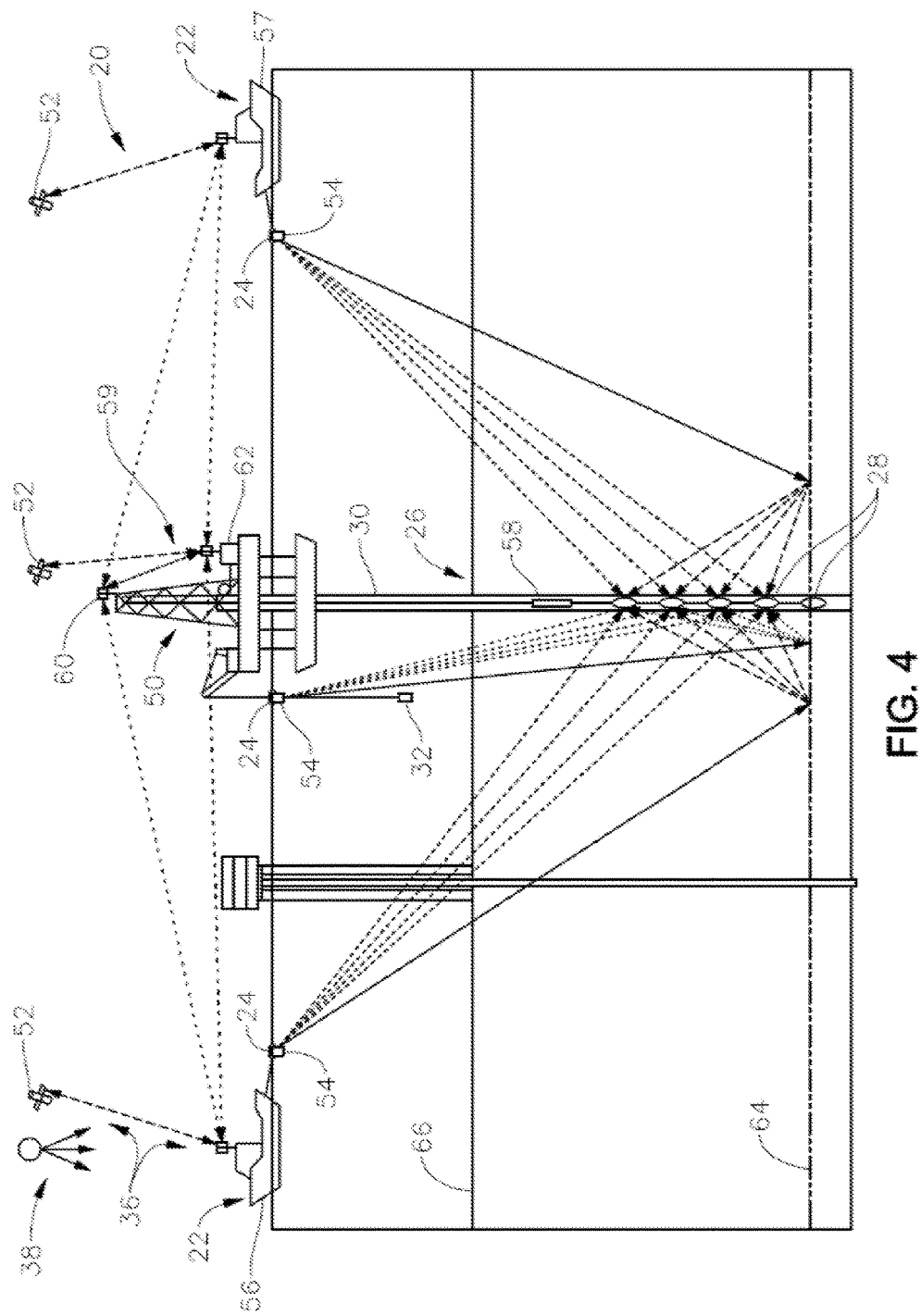
FIG. 4 illustrates a seismic system in accordance with implementations of various technologies and techniques described herein.

FIG. 4 illustrates a seismic system 20 in accordance with implementations of various technologies and techniques described herein. The seismic system 20 may include a plurality of tow vessels 22 that are employed to enable seismic profiling, e.g. three-dimensional vertical seismic profiling or rig/offset vertical seismic profiling. In FIG. 4, a marine system may include a rig 50, a plurality of vessels 22, and one or more acoustic receivers 28. Although a marine system is illustrated, other implementations of the disclosure may not be limited to this example. A person of ordinary skill in the art may recognize that land or offshore systems may be used.

Although two vessels 22 are illustrated in FIG. 4, a single vessel 22 with multiple source arrays 24 or multiple vessels 22 with single or multiple sources 24 may be used. In some implementations, at least one source and/or source array 24 may be located on the rig 50, as shown by the rig source in FIG. 4. As the vessels 22 travel on predetermined or systematic paths, their locations may be recorded through the use of navigation system 36. In some implementations, the navigation system 36 may utilize a global positioning system (GPS) 38 to record the position, speed, direction, and other parameters of the tow vessels 22.

As shown, the global positioning system 38 may utilize or work in cooperation with satellites 52 which operate on a suitable communication protocol, e.g. VSAT communications. The VSAT communications may be used, among other things, to supplement VHF and UHF communications. The GPS information can be independent of the VSAT communications and may be input to a processing system or other suitable processors to predict the future movement and position of the vessels 22 based on real-time information. In addition to predicting future movements, the processing system also can be utilized to provide directions and coordinates as well as to determine initial shot times, as described above. A control system effectively utilizes the processing system in cooperation with a source controller and a synchronization unit to synchronize the sources 24 with the downhole data acquisition system 26.

As shown, the one or more vessels 22 may respectively tow one or more acoustic sources/source arrays 24. The source arrays 24 include one or more seismic signal generators 54, e.g. air guns, configured to create a seismic and/or sonic disturbance. In the implementation illustrated, the tow vessels 22 comprise a master source vessel 56 (Vessel A) and a slave source vessel 57 (Vessel B). However, other numbers and arrangements of tow vessels 22 may be employed to accommodate the parameters of a given seismic profiling application. For example, one source 24 may be mounted at rig 50 (see FIG. 4) or at another suitable location, and both vessels 22 may serve as slave vessels with respect to the rig source 24 or with respect to a source at another location.

However, a variety of source arrangements and implementations may be used. When utilizing dithered timing between the sources, for example, the master and slave locations of the sources can be adjusted according to the parameters of the specific seismic profiling application. In some implementations, one of the source vessels 22 (e.g. source vessel A in FIG. 4) may serve as the master source vessel while the other source vessel 22 serves as the slave source vessel with dithered firing. However, an alternate source vessel 22 (e.g. source vessel B in FIG. 4) may serve as the master source vessel while the other source vessel 22 serves as the slave source vessel with dithered firing.

Similarly, the rig source 22 may serve as the master source while one of the source vessels 22 (e.g. vessel A) serves as the slave source vessel with dithered firing. The rig source 22 also may serve as the master source while the other source vessel 22 (e.g. vessel B) serves as the slave source vessel with dithered firing. In some implementations, the rig source 22 may serve as the master source while both of the source vessels 22 serve as slave source vessels each with dithered firings. These and other implementations may be used in achieving the desired synchronization of sources 22 with the downhole acquisition system 26.

The acoustic receivers 28 of data acquisition system 26 may be deployed in borehole 30 via a variety of delivery systems, such as wireline delivery systems, slickline delivery systems, and other suitable delivery systems. Although a single acoustic receiver 28 could be used in the borehole 30, a plurality of receivers 28, as shown, may be located in a variety of positions and orientations. The acoustic receivers 28 may be configured for sonic and/or seismic reception. Additionally, the acoustic receivers 28 may be communicatively coupled with processing equipment 58 located downhole. In one implementation, processing equipment 58 may comprise a telemetry system for transmitting data from acoustic receivers 28 to additional processing equipment 59 located at the surface, e.g. on the rig 50 and/or vessels 22.

Depending on the data communication system, surface processing equipment 59 may include a radio repeater 60, an acquisition and logging unit 62, and a variety of other and/or additional signal transfer components and signal processing components. The radio repeater 60 along with other components of processing equipment 59 may be used to communicate signals, e.g. UHF and/or VHF signals, between vessels 22 and rig 50 and to enable further communication with downhole data acquisition system 26.

It should be noted the UHF and VHF signals can be used to supplement each other. The UHF band may support a higher data rate throughput, but can be susceptible to obstructions and has less range. The VHF band may be less susceptible to obstructions and may have increased radio range but its data rate throughput is lower. In FIG. 4, the VHF communications may "punch through" an obstruction in the form of a production platform.

In some implementations, the acoustic receivers 28 may be coupled to surface processing equipment 59 via a hardwired connection. In other implementations, wireless or optical connections may be employed. In still other implementations, combinations of coupling techniques may be employed to relay information received downhole via the acoustic receivers 28 to an operator and/or the control system described above, located at least in part at the surface.

In addition to providing raw or processed data uphole to the surface, the coupling system, e.g. downhole processing equipment 58 and surface processing equipment 59, may be designed to transmit data or instructions downhole to the acoustic receivers 28. For example, the surface processing equipment 59 may comprise a synchronization unit, which may coordinate the firing of sources 24, e.g. dithered (delayed) source arrays, with the acoustic receivers 28 located in borehole 30. In one implementation, the synchronization unit may use a coordinated universal time to ensure accurate timing. In some implementations, the coordinated universal time system may be employed in cooperation with global positioning system 38 to obtain UTC data from the GPS receivers of GPS system 38.

FIG. 4 illustrates one example of a system for performing seismic profiling that can employ simultaneous or near-simultaneous acquisition of seismic data. In one implementation, the seismic profiling may comprise three-dimensional vertical seismic profiling, but other applications may utilize rig and/or offset vertical seismic profiling or seismic profiling employing walkaway lines. An offset source can be provided by a source 24 located on rig 50, on a vessel 22, and/or on another vessel or structure. In one implementation, the vessels 22 may be substantially stationary.

In one implementation, the overall seismic system 20 may employ various arrangements of sources 24 on vessels 22 and/or rig 50 with each location having at least one source and/or source array 24 to generate acoustic source signals. The acoustic receivers 28 of downhole acquisition system 26 may be configured to receive the source signals, at least some of which are reflected off a reflection boundary 64 located beneath a sea bottom 66. The acoustic receivers 28 may generate data streams that are relayed uphole to a suitable processing system, e.g. the processing system described above, via downhole telemetry/processing equipment 58.

While the acoustic receivers 28 generate data streams, the navigation system 36 may determine a real-time speed, position, and direction of each vessel 22 and may estimate initial shot times accomplished via signal generators 54 of the appropriate source arrays 24. The source controller may be part of surface processing equipment 59 (located on rig 50, on vessels 22, or at other suitable locations) and may be designed to control firing of the acoustic source signals so that the timing of an additional shot time (e.g. a shot time via slave vessel 57) is based on the initial shot time (e.g. a shot time via master vessel 56) plus a dither value.

The synchronization unit of, for example, surface processing equipment 59, may coordinate the firing of dithered acoustic signals with recording of acoustic signals by the downhole acquisition system 26. The processor system may be configured to separate a data stream of the initial shot and a data stream of the additional shot via a coherency filter. As discussed above, however, other implementations may employ pure simultaneous acquisition and/or may not use separation of the data streams. In such implementations, the dither is effectively zero.

After an initial shot time at T=0 (T0) is determined, subsequent firings of acoustic source arrays 24 may be offset by a dither. The dithers can be positive or negative and sometimes are created as pre-defined random delays. Use of dithers facilitates the separation of simultaneous or near-simultaneous data sets to simplify the data processing. The ability to have the acoustic source arrays 24 fire in simultaneous or near-simultaneous patterns may reduce the overall amount of time for three-dimensional vertical seismic profiling source acquisition. This, in turn, may significantly reduce rig time. As a result, the overall cost of the seismic operation may be reduced, rendering the data intensive process much more accessible.

If the acoustic source arrays used in the seismic data acquisition are widely separated, the difference in move-outs across the acoustic receiver array of the wave fields generated by the acoustic sources 24 can be used to obtain a clean data image via processing the data without further special considerations. However, even when the acoustic sources 24 are substantially co-located in time, data acquired by any of the methods involving dithering of the firing times of the individual sources 24 described herein can be processed to a formation image leaving hardly any artifacts in the final image. This is accomplished by taking advantage of the incoherence of the data generated by one acoustic source 24 when seen in the reference time of the other acoustic source 24.

Attention is now directed to methods, techniques, and workflows for processing and/or transforming collected data that are in accordance with some implementations. Some operations in the processing procedures, methods, techniques, and workflows disclosed herein may be combined and/or the order of some operations may be changed. In the geosciences and/or other multi-dimensional data processing disciplines, various interpretations, sets of assumptions, and/or domain models such as velocity models, may be refined in an iterative fashion; this concept may be applicable to the procedures, methods, techniques, and workflows as discussed herein. This iterative refinement can include use of feedback loops executed on an algorithmic basis, such as via a computing system, as discussed later, and/or through manual control by a user who may make determinations regarding whether a given action, template, or model has become accurate.

Determining Phase Behavior

As mentioned above, a reservoir disposed in a subterranean formation may contain hydrocarbons. These reservoirs may hereinafter be referred to as hydrocarbon reservoirs. Types of hydrocarbon reservoirs may include shale reservoirs. Reservoir fluids disposed in these reservoirs may contain the hydrocarbons, and the reservoir fluids may be obtained using systems and/or methods described above with respect to FIGS. 1.1-4. The reservoir fluids may take the form of oil, gas condensate, and/or the like.

Phase behavior of a reservoir fluid disposed in a hydrocarbon reservoir may be taken into account during a production process and/or simulation process of the reservoir. Specifically, the phase behavior of the reservoir fluid may include indications of how the reservoir fluid behaves in terms of its relative proportion of liquid to gas under a particular pressure and temperature.

Figure 5:
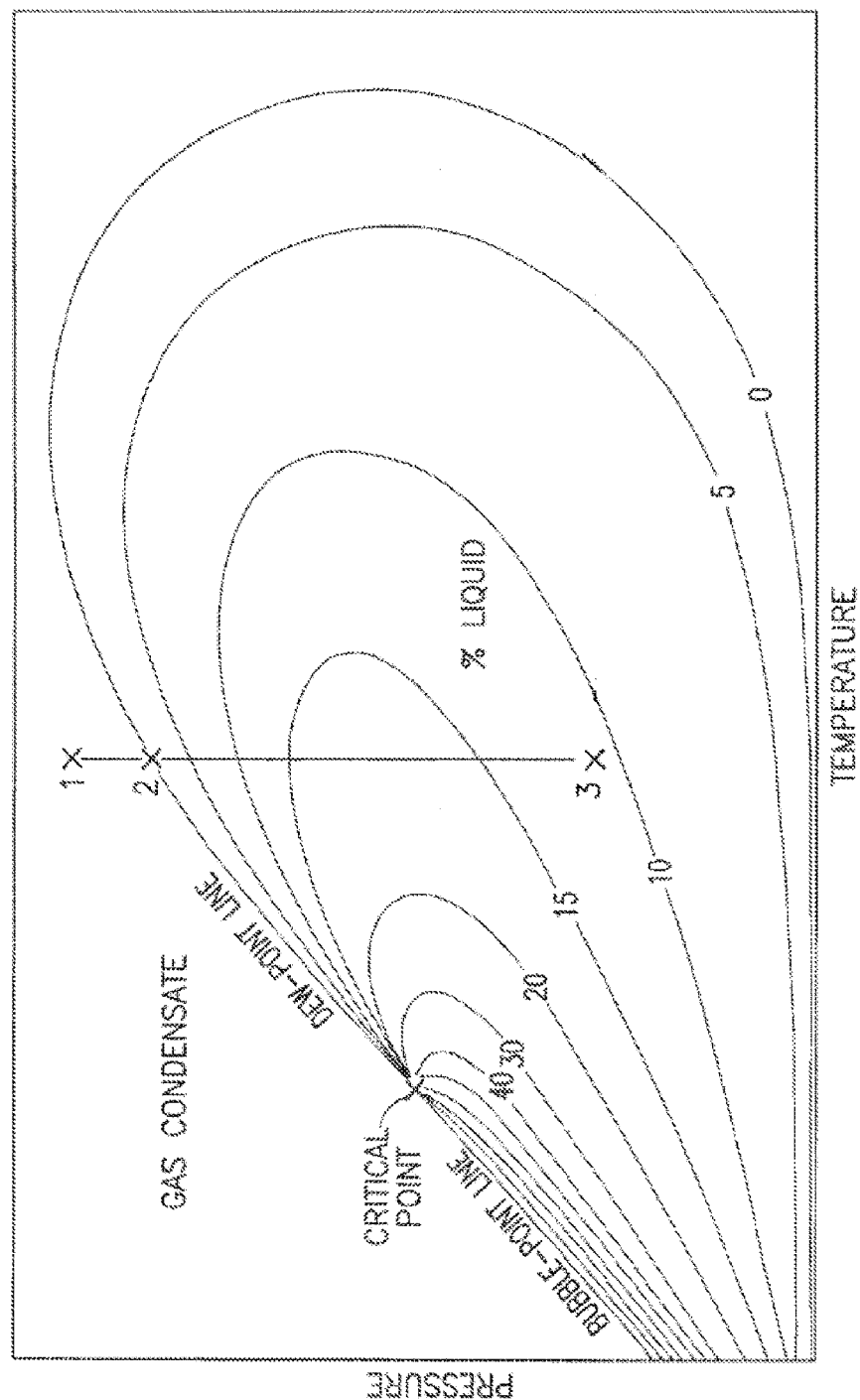
FIG. 5 illustrates a phase diagram of a gas condensate reservoir in connection with implementations of various techniques described herein.

For example, FIG. 5 illustrates a phase diagram of a gas condensate reservoir in connection with implementations of various techniques described herein. Gas condensate may also be referred to as retrograde gas. The phase diagram may show how gas condensate can transition back and forth between a gas phase and a liquid phase. Point 1 in FIG. 5 corresponds to a gas phase. The line from point 1 to 3 may be an isotherm where the temperature is kept constant while the pressure is reduced. Initially, at point 1, gas condensate reservoirs may have high enough temperature and pressure such that, before the production starts, hydrocarbon components are in the single, gas phase. Once production starts, however, the pressure in the reservoir may decline, as shown in FIG. 5. When the pressure becomes equal to that of point 2 on the dew-point line, the gas may begin to condense and liquid (i.e., gas condensate) may begin to form, creating a two-phase mixture in rock pores of the reservoir. In particular, the heavier components of the gas may liquefy. As pressure is further reduced, as indicated by the progression of pressure from point 2 to point 3, more of the heavy components of the gas may liquefy, thereby producing more gas condensate. In one implementation, a maximum amount of liquid may be produced at a pressure between point 2 and point 3. The majority of the produced fluid may be gas, while the liquid dropout, or gas condensate, may not flow as fast as the gas. As this trend continues, the volume of gas condensate may increase in the reservoir, thereby reducing the permeability of a gas flow. As such, gas production from a gas wellsite positioned in the reservoir may decrease. Further reduction of pressure may lead to the hydrocarbon components transitioning to the single, gas phase again.

Thus, accurately determining a phase behavior of a reservoir fluid containing hydrocarbons may assist in a simulation process and/or a production process for a hydrocarbon reservoir. In particular, knowledge of the phase behavior of reservoir fluids may be used to evaluate a production capability of the oil or gas wells disposed in the hydrocarbon reservoir.

Figure 6:
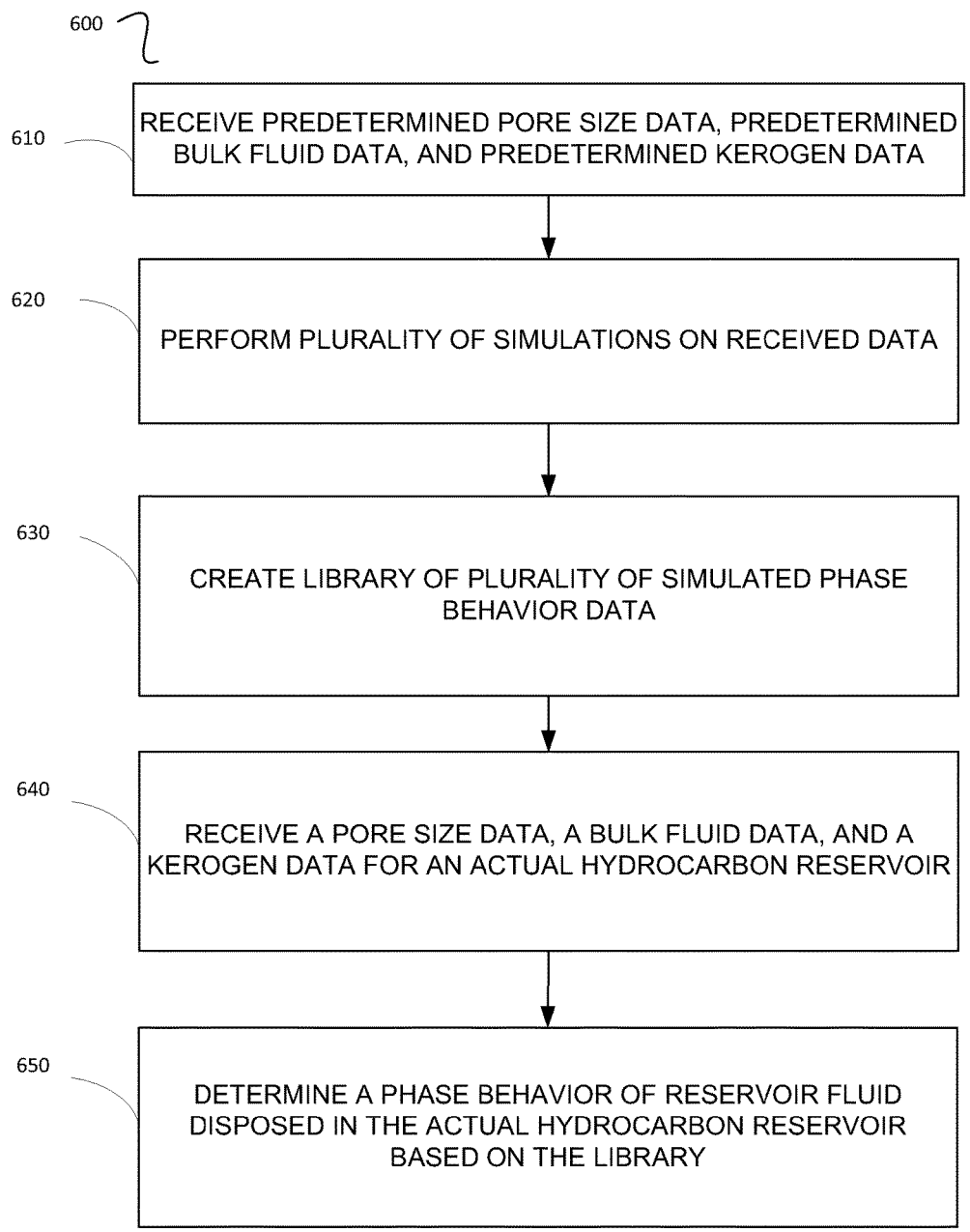
FIG. 6 illustrates a flow diagram of a method for determining a phase behavior of a reservoir fluid disposed in a hydrocarbon reservoir in accordance with implementations of various techniques described herein.

FIG. 6 illustrates a flow diagram of a method 600 for determining a phase behavior of a reservoir fluid disposed in a hydrocarbon reservoir in accordance with implementations of various techniques described herein. In one implementation, method 600 may be performed by a computer application. It should be understood that while method 600 indicates a particular order of execution of operations, in some implementations, certain portions of the operations might be executed in a different order. Further, in some implementations, additional operations or blocks may be added to the method. Likewise, some operations or blocks may be omitted.

At block 610, a plurality of predetermined pore size data, a plurality of predetermined bulk fluid data, and a plurality of predetermined kerogen data may be received.

Pore size data may represent one or more size values of pores distributed at a depth point in a hydrocarbon reservoir. The depth point may be a portion of the hydrocarbon reservoir disposed at or near a particular depth. In one implementation, the pore size data may be an average of the size values of pores distributed at such a depth point. In another implementation, the pore size data may represent one or more size values of nanopores distributed at a depth point in a hydrocarbon reservoir. In yet another implementation, the pore size data may represent pores with size values less than or equal to 100 nanometers (nm).

Bulk fluid data may represent a composition of a reservoir fluid disposed in a hydrocarbon reservoir under bulk conditions. Bulk conditions may refer to the fluid being disposed in large pores in the reservoir. In one implementation, the bulk fluid data may be derived by examining the reservoir fluid in a container in a laboratory. In such an implementation, the container may be considered to be a significantly large pore.

The bulk fluid data may include molar composition values of hydrocarbons contained in the reservoir fluid under bulk conditions. The molar composition values may be the relative proportions of methane ($C_1$), ethane ($C_2$), propane ($C_3$), butane ($C_4$), pentane ($nC_5$), isopentane ($iC_5$), hexane ($C_6$), heptane ($C_7$), and so forth within the reservoir fluid. In one implementation, the molar composition values may include a proportion of $C_{7+}$ within the reservoir fluid, where $C_{7+}$ represents hydrocarbons having 7 or more carbon atoms. In one example, the bulk fluid data for a reservoir fluid under bulk conditions may be 67% of $C_1$, 10% of $C_2$, 6% of $C_3$, 5% of $C_4$, 2% of $nC_5$, 2% of $iC_5$, 2% of $C_6$, and 6% of $C_{7+}$.

Kerogen data may represent a composition of organic chemical compounds found in a hydrocarbon reservoir. In one implementation, the kerogen data may represent the composition of organic chemical compounds found in the pore surfaces of the hydrocarbon reservoir. In such an implementation, the organic chemical compounds in the pore surfaces may interact with molecules of the reservoir fluid disposed in the hydrocarbon reservoir. In another implementation, the organic chemical compounds may include complex molecules.

The kerogen data may include values representing one or more of the following: relative proportions of periodic elements, such as carbon, hydrogen, nitrogen, sulfur, and oxygen; amounts of aliphatic carbon and/or aromatic carbon; relative proportions of sulfur compounds, such as thiophene, sulfide, and sulfoxide; relative proportions of nitrogen compounds, such as pyrrole, pyridine, and quaternary; relative proportions of oxygen compounds, such as ketone, aldehyde, carboxylic acid, alcohol, ester, and ether; and structural parameters, such as an average size of aromatic rings and average length of aliphatic chains.

In another implementation, the computer application may receive the predetermined pore size data, predetermined kerogen data, and predetermined bulk fluid data in the form of a plurality of groups. For example, the computer application may receive a first group of data composed of a first predetermined pore size data, a first predetermined kerogen data, and a first predetermined bulk fluid data. The computer application may then receive a second group of data composed of a second predetermined pore size data, a second predetermined kerogen data, and a second predetermined bulk fluid data. The computer application may receive a third group, a fourth group, and so on. Each group of data may be different than the other groups. For example, the third group of data may be composed of the first predetermined pore size data, the second predetermined kerogen data, and the first predetermined bulk fluid data, which is a different combination of data than the first or second group. The data included in each group may be simulated together, as further discussed below.

In yet another implementation, the predetermined pore size data, predetermined kerogen data, and predetermined bulk fluid data received by the computer application may be based on historical data derived from hydrocarbon reservoirs located around the world. In such an implementation, an engineer or scientist may select the predetermined data based on ranges of values for pore size data, kerogen composition data, and bulk fluid composition data that have previously been derived from hydrocarbon reservoirs. For example, certain hydrocarbon reservoirs may historically have pores with size values that range between 1 nm to 100 nm. In such an example, a scientist may select the first predetermined pore size data based on one or more size values of this range for input to the computer application. In another implementation, the predetermined pore size data, kerogen data, and bulk fluid data of a single group may each be based on historical data of different hydrocarbon reservoirs.

At block 620, a plurality of simulations may be performed on the received predetermined pore size data, predetermined bulk fluid data, and predetermined kerogen data. An output of each simulation may be simulated phase behavior data that corresponds to a hydrocarbon reservoir characterized by the received predetermined pore size data, predetermined bulk fluid data, and predetermined kerogen data. The simulated phase behavior data may represent a phase behavior of a reservoir fluid disposed in such a hydrocarbon reservoir at a particular pressure and temperature. In one implementation, the simulated phase behavior data may take the form of one or more phase diagrams, such as the phase diagram shown in FIG. 5.

In another implementation, the type of simulations performed on the data may include molecular dynamics simulations. A molecular dynamics simulation may be defined as a computer simulation of physical movements of atoms and molecules under the influence of physical forces. Accordingly, the molecular dynamics simulation may be used to simulate a phase behavior of hydrocarbon molecules disposed in the pores of a hydrocarbon reservoir. In a further implementation, each molecular dynamics simulation may produce simulated phase behavior data in the form of a phase diagram.

In yet another implementation, a simulation may be performed on each group of data received, such that simulated phase behavior data (e.g., a phase diagram) is produced for each group of data. In such an implementation, the predetermined pore size data, predetermined kerogen data, and predetermined bulk fluid data of a group may be simulated together.

In one example, a first simulation may be performed on the first group of data, where, as described above, the first group of data is composed of the first predetermined pore size data, the first predetermined kerogen data, and the first predetermined bulk fluid data. The data of the first group may be simulated together. In turn, the first simulation may produce a first phase diagram representing a reservoir fluid characterized by the data of the first group. Similarly, a second simulation performed on the second group of data may produce a second phase diagram representing a reservoir fluid characterized by the data of the second group, a third simulation performed on the third group of data may produce a third phase diagram representing a reservoir fluid characterized by the data of the third group, and so forth.

At block 630, a library of the plurality of simulated phase behavior data may be created. In one implementation, the library may include a plurality of phase diagrams, where each phase diagram corresponds to a different simulation. In a further implementation, each phase diagram may correspond to a different group of data simulated at block 620. In another implementation, the library may take the form of a lookup table. In yet another implementation, the simulated phase behavior data, such as the phase diagrams, may be stored in the library along with its associated predetermined pore size data, predetermined bulk fluid data, and predetermined kerogen data. For example, the first phase diagram may be stored in the library along with the first group of data.

At block 640, a pore size data, a bulk fluid data, and a kerogen data corresponding to a depth point in an actual hydrocarbon reservoir may be received. In one implementation, the actual hydrocarbon reservoir may be a newly discovered hydrocarbon reservoir somewhere in the world or an existing hydrocarbon reservoir whose pore size data, bulk fluid data, and kerogen data are unknown. The actual hydrocarbon reservoir may be a shale reservoir. The pore size data, the bulk fluid data, and the kerogen data may have been acquired at the depth point in the actual hydrocarbon reservoir using various methods and/or systems, as discussed below.

This pore size data may represent one or more size values of pores distributed at the depth point in the actual hydrocarbon reservoir. In one implementation, this pore size data may have been measured from a core of the actual hydrocarbon reservoir using a scanning electron microscope (SEM), focused ion beam scanning electron microscope (FIB-SEM), nano computerized tomography (nano-CT), mercury injection capillary pressure (MICP), small angle x-ray scattering, small angle neutron scattering, gas adsorption, transmission electron microscopy, and/or any other measurement technique known to those skilled in the art. In another implementation, the pore size data may be inferred through well logs of the actual hydrocarbon reservoir using nuclear magnetic resonance (NMR) spectroscopy combined with other well logging methods. In another implementation, the pore size data may be an average of the size values of pores found at the depth point. In yet another implementation, the pore size data may represent one or more size values of nanopores distributed at the depth point in the actual hydrocarbon reservoir.

The bulk fluid data may represent a composition of a reservoir fluid disposed at the depth point in the actual hydrocarbon reservoir under bulk conditions. In one implementation, the bulk fluid data may be obtained via laboratory measurements of a downhole sample of this reservoir fluid. The sample may have been collected in an initial production life of a well of the reservoir. In another implementation, the bulk fluid data may have been obtained using an extraction of the reservoir fluid from a core sample of the actual hydrocarbon reservoir.

The kerogen data may represent a composition of organic chemical compounds found at the depth point in the actual hydrocarbon reservoir. In one implementation, the kerogen data may have been obtained via measurements of the actual hydrocarbon reservoir. The measurements may have been performed using infrared spectroscopy, Raman spectroscopy, NMR spectroscopy, XANES spectroscopy, elemental analysis, and/or any other measurement technique known to those skilled in the art. In another implementation, the kerogen data may be based on measurements of isosteric heat of adsorption on cuttings, core, or outcrop of the reservoir.

At block 650, a phase behavior of a reservoir fluid disposed at the depth point in the actual hydrocarbon reservoir may be determined based on the library. In one implementation, the phase behavior may be determined by matching the pore size data, bulk fluid data, and kerogen data corresponding to the depth point in the actual hydrocarbon reservoir with the predetermined pore size data, predetermined bulk fluid data, and predetermined kerogen data stored in the library. In a further implementation, where the library is in the form of a lookup table, this matching may be performed by entering the pore size data, bulk fluid data, and kerogen data of the actual hydrocarbon reservoir into the lookup table.

In one implementation, the pore size data, bulk fluid data, and kerogen data corresponding to the depth point in the actual hydrocarbon reservoir may match with data in the library if the pore size data, bulk fluid data, and kerogen data are substantially the same as a group of data stored in the library. In such an implementation, it may be determined that the simulated phase behavior data associated with this group of data also represents the phase behavior of the reservoir fluid disposed at the depth point in the actual hydrocarbon reservoir.

For example, the pore size data, bulk fluid data, and kerogen data corresponding to the depth point in the actual hydrocarbon reservoir may match with the first group of data stored in the library, as their respective data may be substantially the same. It follows, then, that the phase behavior of reservoir fluid disposed at the depth point of the actual hydrocarbon reservoir may be substantially the same as the phase behavior (shown by the first phase diagram) associated with this first group of data. Thus, it may be determined that the first phase diagram also represents the phase behavior of the reservoir fluid disposed at the depth point in the actual hydrocarbon reservoir.

In another implementation, the pore size data, bulk fluid data, and kerogen data corresponding to the depth point of the actual hydrocarbon reservoir may not be substantially the same as a group of data stored in the library. However, the pore size data, bulk fluid data, and kerogen data may be similar to the data of two or more groups stored in the library. In such an implementation, an extrapolation process may be performed on the multiple groups of data to derive phase behavior data (e.g., a phase diagram) for the reservoir fluid disposed at the depth point in the actual hydrocarbon reservoir.

In sum, the implementations for determining a phase behavior of a reservoir fluid, described above with respect to FIGS. 1-6, may assist in a simulation process and/or a production process for a hydrocarbon reservoir.

For example, the implementations described above may account for factors that can alter the phase behavior of the reservoir fluid in the hydrocarbon reservoir, such as the pore size distribution, kerogen composition, and bulk fluid composition of the hydrocarbon reservoir. In particular, for pores of a smaller size, such as nanopores, a phase envelope of the hydrocarbon reservoir may be reduced, such that a dew point or bubble point may occur at lower pressures than expected. For gaseous hydrocarbons, this phase envelope reduction may lead to a decrease of gas-in-place. The phase envelope reduction may also affect a drawdown of a gas well, which may have an impact on hydraulic fracture degradation, proppant embedment, and proppant crushing.

Thus, by performing simulations based on factors such as pore size distribution, kerogen composition, and bulk fluid composition, the implementations as described above may provide more accurate knowledge of the phase behavior of reservoir fluids, which in turn may have an effect on a simulation process and/or a production process for the reservoir. Further, the implementations as described above may lead to more accurate reservoir simulations. The more accurate reservoir simulations may then produce more accurate values of oil and gas reserves and hydrocarbons-in-place, thereby allowing for a more accurate evaluation of production capability of oil or gas wells in the reservoir.

Figure 7:
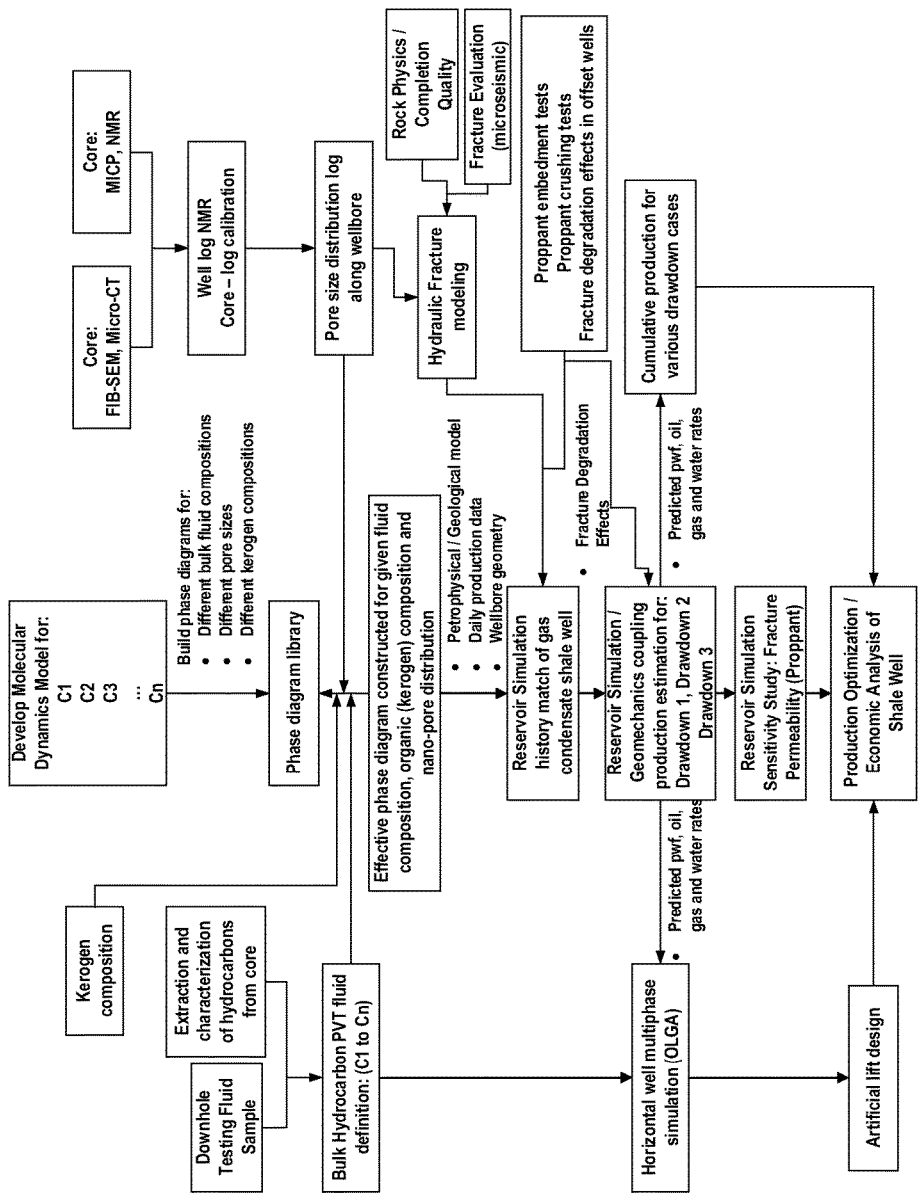
FIG. 7 illustrates a production optimization workflow for a shale reservoir in accordance with implementations of various techniques described herein.

For example, FIG. 7 illustrates a production optimization workflow for a shale reservoir in accordance with implementations of various techniques described herein. The production optimization workflow may include implementations as described above for determining a phase diagram of a reservoir fluid disposed in nanopores of an actual shale reservoir. This phase diagram may be used as an input to one or more stages of a reservoir simulation. The reservoir simulation may also incorporate data regarding fracture degradation, as drawdown may have an effect on the fracture degradation. In one implementation, a drawdown pressure may be selected based on the phase diagram, where the selected drawdown pressure may be near (but above) the pressure at which the reservoir fluid transitions in phase. In such an implementation, a flow rate of the reservoir fluid may be maximized while the fluid exists in a single phase. The reservoir simulation may similarly incorporate data and/or tests relating to proppant embedment and proppant crushing. Once an oil and gas simulator (i.e., OLGA) models the wellbore, an artificial lifting system may be designed.

Ultimately, the implementations as described above for determining phase behavior may be incorporated with a number of other factors to produce a more accurate reservoir simulation, production optimization, and/or economic analysis for the shale gas reservoir.

In some implementations, a method for determining a phase behavior of a reservoir fluid may be provided. The method may receive a plurality of predetermined pore size data, a plurality of predetermined bulk fluid data, and a plurality of predetermined kerogen data that are based on historical data for a plurality of hydrocarbon reservoirs. The method may create a library of a plurality of simulated phase behavior data for the predetermined pore size data, the predetermined bulk fluid data, and the predetermined kerogen data. The method may determine a phase behavior of a reservoir fluid disposed in an actual hydrocarbon reservoir using the library.

In some implementations, the method may receive a first group of data composed of a first predetermined pore size data, a first predetermined kerogen data, and a first predetermined bulk fluid data, and may receive a second group of data composed of a second predetermined pore size data, a second predetermined kerogen data, and a second predetermined bulk fluid data. The method may perform a first simulation on the first group of data to produce a first phase diagram, perform a second simulation on the second group of data to produce a second phase diagram, and store the first phase diagram and the second phase diagram in the library. The method may receive an acquired pore size data, an acquired bulk fluid data, and an acquired kerogen data corresponding to the actual hydrocarbon reservoir, and may determine that the phase behavior of the reservoir fluid corresponds to the first phase diagram if the acquired pore size data, the acquired bulk fluid data, and the acquired kerogen data are substantially the same as the first group of data. The method may receive an acquired pore size data, an acquired bulk fluid data, and an acquired kerogen data corresponding to the actual hydrocarbon reservoir, determine that the acquired pore size data, the acquired bulk fluid data, and the acquired kerogen data are similar to the first group of data and the second group of data, and derive a phase diagram of the reservoir fluid by extrapolating the first group of data with the second group of data. The predetermined pore size data may include a representation of one or more size values of nanopores distributed in at least one of the hydrocarbon reservoirs. The predetermined bulk fluid data may include molar composition values of hydrocarbons disposed in at least one of the hydrocarbon reservoirs under bulk conditions. The predetermined kerogen data may include a composition of organic chemical compounds found in pore surfaces of at least one of the hydrocarbon reservoirs. The method may also perform a simulation of the actual hydrocarbon reservoir using the determined phase behavior of the reservoir fluid. The method may additionally perform a plurality of molecular dynamic simulations on the predetermined pore size data, the predetermined bulk fluid data, and the predetermined kerogen data to produce the plurality of simulated phase behavior data. The plurality of simulated phase behavior data may include a plurality of phase diagrams representing phase behavior of one or more fluids in the hydrocarbon reservoirs. The library may include a lookup table. The method may also select a drawdown pressure for the actual hydrocarbon reservoir based on the determined phase behavior of the reservoir fluid in order to maximize a flow rate of the reservoir fluid.

In some implementations, an information processing apparatus for use in a computing system is provided, and includes means for receiving a plurality of predetermined pore size data, a plurality of predetermined bulk fluid data, and a plurality of predetermined kerogen data that are based on historical data for a plurality of hydrocarbon reservoirs. The information processing apparatus may also have means for creating a library of a plurality of simulated phase behavior data for the predetermined pore size data, the predetermined bulk fluid data, and the predetermined kerogen data. The information processing apparatus may also have means for determining a phase behavior of a reservoir fluid disposed in an actual hydrocarbon reservoir using the library.

In some implementations, a computing system is provided that includes at least one processor, at least one memory, and one or more programs stored in the at least one memory, wherein the programs include instructions, which when executed by the at least one processor cause the computing system to receive a plurality of predetermined pore size data, a plurality of predetermined bulk fluid data, and a plurality of predetermined kerogen data that are based on historical data for a plurality of hydrocarbon reservoirs. The programs may further include instructions to cause the computing system to create a library of a plurality of simulated phase behavior data for the predetermined pore size data, the predetermined bulk fluid data, and the predetermined kerogen data. The programs may further include instructions to cause the computing system to determining a phase behavior of a reservoir fluid disposed in an actual hydrocarbon reservoir using the library.

In some implementations, a computer readable storage medium is provided, which has stored therein one or more programs, the one or more programs including instructions, which when executed by a processor, cause the processor to receive a plurality of predetermined pore size data, a plurality of predetermined bulk fluid data, and a plurality of predetermined kerogen data that are based on historical data for a plurality of hydrocarbon reservoirs. The programs may further include instructions, which cause the processor to create a library of a plurality of simulated phase behavior data for the predetermined pore size data, the predetermined bulk fluid data, and the predetermined kerogen data. The programs may further include instructions, which cause the processor to determine a phase behavior of a reservoir fluid disposed in an actual hydrocarbon reservoir using the library.

Computing Systems

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. The distributed computing environments may span multiple continents and multiple vessels, ships or boats. In a distributed computing environment, program modules may be located in both local and remote computer storage media including memory storage devices.

Figure 8:
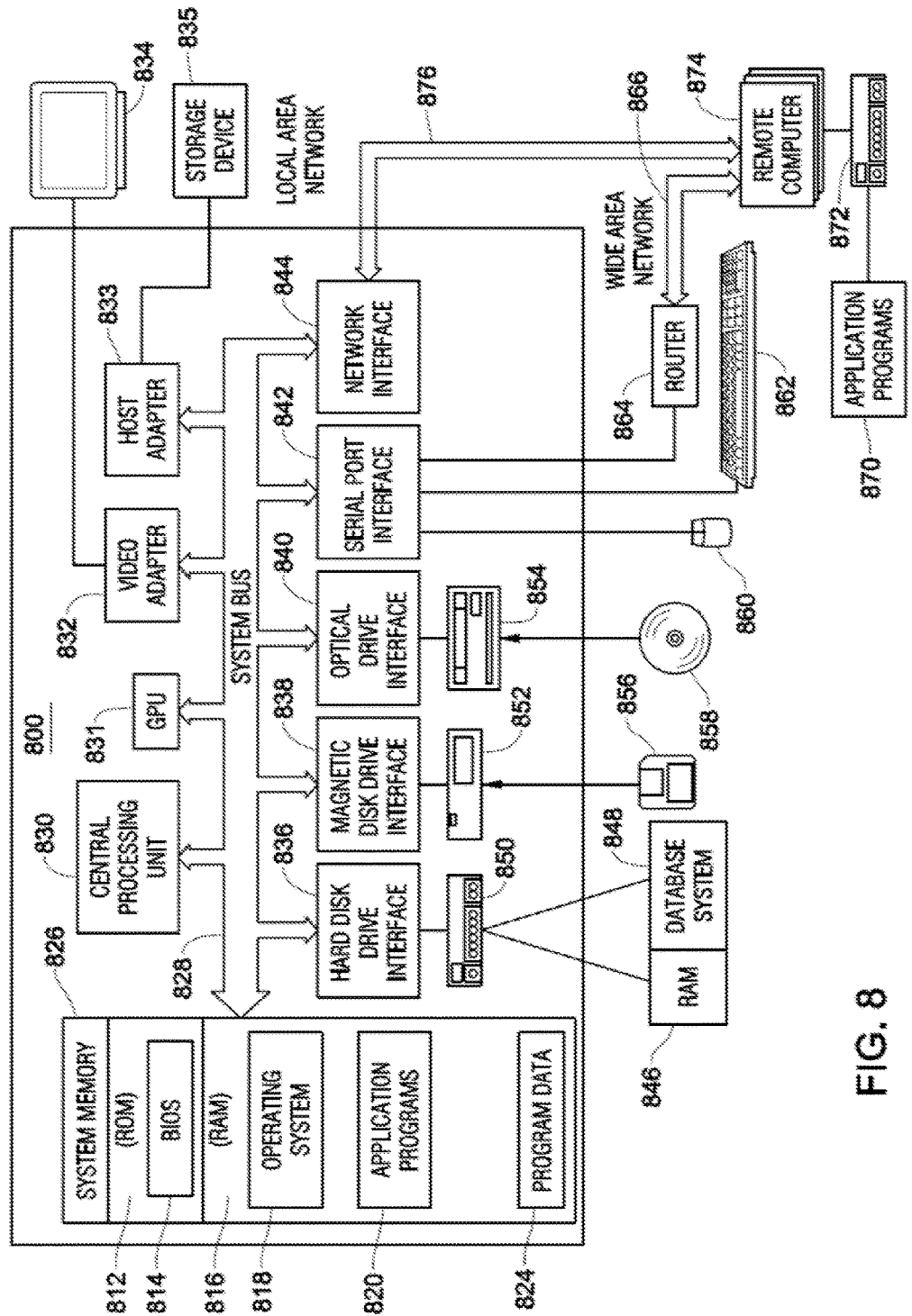
FIG. 8 illustrates a computing system in which various implementations of various techniques described herein may be implemented.

FIG. 8 illustrates a schematic diagram of a computing system 800 in which the various technologies described herein may be incorporated and practiced. Although the computing system 800 may be a conventional desktop or a server computer, as described above, other computer system configurations may be used.

The computing system 800 may include a central processing unit (CPU) 830, a system memory 826, a graphics processing unit (GPU) 831 and a system bus 828 that couples various system components including the system memory 826 to the CPU 830. Although one CPU is illustrated in FIG. 8, it should be understood that in some implementations the computing system 800 may include more than one CPU. The GPU 831 may be a microprocessor specifically designed to manipulate and implement computer graphics. The CPU 830 may offload work to the GPU 831. The GPU 831 may have its own graphics memory, and/or may have access to a portion of the system memory 826. As with the CPU 830, the GPU 831 may include one or more processing units, and the processing units may include one or more cores. The system bus 828 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 826 may include a read-only memory (ROM) 812 and a random access memory (RAM) 846. A basic input/output system (BIOS) 814, containing the basic routines that help transfer information between elements within the computing system 800, such as during start-up, may be stored in the ROM 812.

The computing system 800 may further include a hard disk drive 850 for reading from and writing to a hard disk, a magnetic disk drive 852 for reading from and writing to a removable magnetic disk 856, and an optical disk drive 854 for reading from and writing to a removable optical disk 858, such as a CD ROM or other optical media. The hard disk drive 850, the magnetic disk drive 852, and the optical disk drive 854 may be connected to the system bus 828 by a hard disk drive interface 836, a magnetic disk drive interface 838, and an optical drive interface 840, respectively. The drives and their associated computer-readable media may provide nonvolatile storage of computer-readable instructions, data structures, program modules and other data for the computing system 800.

Although the computing system 800 is described herein as having a hard disk, a removable magnetic disk 856 and a removable optical disk 858, it should be appreciated by those skilled in the art that the computing system 800 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 800. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 800 may also include a host adapter 833 that connects to a storage device 835 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 850, magnetic disk 856, optical disk 858, ROM 812 or RAM 816, including an operating system 818, one or more application programs 820, program data 824, and a database system 848. The application programs 820 may include various mobile applications ("apps") and other applications configured to perform various methods and techniques described herein. The operating system 818 may be any suitable operating system that may control the operation of a networked personal or server computer, such as Windows® XP, Mac OS® X, Unix-variants (e.g., Linux® and BSD®), and the like.

A user may enter commands and information into the computing system 800 through input devices such as a keyboard 862 and pointing device 860. Other input devices may include a microphone, joystick, game pad, satellite dish, scanner, or the like. These and other input devices may be connected to the CPU 830 through a serial port interface 842 coupled to system bus 828, but may be connected by other interfaces, such as a parallel port, game port or a universal serial bus (USB). A monitor 834 or other type of display device may also be connected to system bus 828 via an interface, such as a video adapter 832. In addition to the monitor 834, the computing system 800 may further include other peripheral output devices such as speakers and printers.

Further, the computing system 800 may operate in a networked environment using logical connections to one or more remote computers 874. The logical connections may be any connection that is commonplace in offices, enterprise-wide computer networks, intranets, and the Internet, such as local area network (LAN) 876 and a wide area network (WAN) 866. The remote computers 874 may be another a computer, a server computer, a router, a network PC, a peer device or other common network node, and may include many of the elements describes above relative to the computing system 800. The remote computers 874 may also each include application programs 870 similar to that of the computer action function.

When using a LAN networking environment, the computing system 800 may be connected to the local network 876 through a network interface or adapter 844. When used in a WAN networking environment, the computing system 800 may include a router 864, wireless router or other means for establishing communication over a wide area network 866, such as the Internet. The router 864, which may be internal or external, may be connected to the system bus 828 via the serial port interface 842. In a networked environment, program modules depicted relative to the computing system 800, or portions thereof, may be stored in a remote memory storage device 872. It will be appreciated that the network connections shown are merely examples and other means of establishing a communications link between the computers may be used.

The network interface 844 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 874.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The computing system 800 may be located at a data center remote from the survey region. The computing system 800 may be in communication with the receivers (either directly or via a recording unit, not shown), to receive signals indicative of the reflected seismic energy. These signals, after conventional formatting and other initial processing, may be stored by the computing system 800 as digital data in the disk storage for subsequent retrieval and processing in the manner described above. In one implementation, these signals and data may be sent to the computing system 800 directly from sensors, such as geophones, hydrophones and the like. When receiving data directly from the sensors, the computing system 800 may be described as part of an in-field data processing system. In another implementation, the computing system 800 may process seismic data already stored in the disk storage. When processing data stored in the disk storage, the computing system 800 may be described as part of a remote data processing center, separate from data acquisition. The computing system 800 may be configured to process data as part of the in-field data processing system, the remote data processing system or a combination thereof.

Those with skill in the art will appreciate that any of the listed architectures, features or standards discussed above with respect to the example computing system 800 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

The foregoing description, for purpose of explanation, has been described with reference to specific implementations. However, the illustrative discussions above are not intended to be exhaustive or to limit the above-described implementations to the precise forms disclosed. Many modifications and variations are possible in view of the above teachings. The implementations were chosen and described in order to explain the principles of the above-described implementations and their practical applications, to thereby enable others skilled in the art to utilize the above-described implementations with various modifications as are suited to the particular use contemplated.

What is claimed is:

1. A method of determining a phase behavior of a reservoir fluid disposed in an actual hydrocarbon reservoir, the method comprising:
   receiving a plurality of predetermined pore size data, a plurality of predetermined bulk fluid data, and a plurality of predetermined kerogen data that are based on historical data for a plurality of hydrocarbon reservoirs, wherein receiving the plurality of predetermined pore size data, the plurality of predetermined bulk fluid data, and the plurality of predetermined kerogen data comprises:
      receiving a first group of data composed of a first predetermined pore size data, a first predetermined kerogen data, and a first predetermined bulk fluid data; and
      receiving a second group of data composed of a second predetermined pore size data, a second predetermined kerogen data, and a second predetermined bulk fluid data;
   creating a computer-implemented library of a plurality of simulated phase behavior data for the predetermined pore size data, the predetermined bulk fluid data, and the predetermined kerogen data, wherein each of the plurality of simulated phase behavior data is stored in the library and is associated with a predetermined pore size data from among the plurality of predetermined pore size data, a predetermined bulk fluid data from among the plurality of bulk fluid data, and a predetermined kerogen data among the plurality of predetermined kerogen data, wherein creating the library of the plurality of simulated phase behavior data comprises:
      performing a first computer simulation on the first group of data to produce a first phase diagram;
      performing a second computer simulation on the second group of data to produce a second phase diagram; and
      storing the first phase diagram and the second phase diagram in the library;
   determining the phase behavior of the reservoir fluid disposed in the actual hydrocarbon reservoir without performing a computer simulation on a pore size data, a bulk fluid data and a kerogen data corresponding to the actual hydrocarbon reservoir and using the library by accessing the library and matching the pore size data, the bulk fluid data and the kerogen data corresponding to the actual hydrocarbon reservoir with that of a simulated phase behavior data among the plurality of simulated phase behavior data stored in the created library; and
   selecting a drawdown pressure for the actual hydrocarbon reservoir based on the determined phase behavior of the reservoir fluid in order to maximize a flow rate of the reservoir fluid;
   wherein the pore size data corresponding to the actual hydrocarbon reservoir is an acquired pore size data, the bulk fluid data corresponding to the actual hydrocarbon reservoir is an acquired bulk fluid data, and the kerogen data corresponding to the actual hydrocarbon reservoir is an acquired kerogen data corresponding to the actual hydrocarbon reservoir; and
   wherein determining the phase behavior of the reservoir fluid comprises determining that the phase behavior of the reservoir fluid corresponds to the first phase diagram by matching the acquired pore size data, the acquired bulk fluid data, and the acquired kerogen data to the first group of data.

2. The method of claim 1, wherein the method further includes determining the phase behavior of a second reservoir fluid by:
   receiving a second acquired pore size data, a second acquired bulk fluid data, and a second acquired kerogen data;
   determining similarity of the second acquired pore size data, the second acquired bulk fluid data, and the second acquired kerogen data to the first group of data and the second group of data; and
   deriving a phase diagram of the second reservoir fluid by extrapolating the first group of data with the second group of data.

3. The method of claim 1, wherein the predetermined pore size data comprises a representation of one or more size values of nanopores distributed in at least one of the hydrocarbon reservoirs.

4. The method of claim 1, wherein the predetermined bulk fluid data comprises molar composition values of hydrocarbons disposed in at least one of the hydrocarbon reservoirs under bulk conditions.

5. The method of claim 1, wherein the predetermined kerogen data comprises a composition of organic chemical compounds found in pore surfaces of at least one of the hydrocarbon reservoirs.

6. The method of claim 1, further comprising performing a simulation of the actual hydrocarbon reservoir using the determined phase behavior of the reservoir fluid.

7. The method of claim 1, further comprising performing a plurality of molecular dynamic simulations on the predetermined pore size data, the predetermined bulk fluid data, and the predetermined kerogen data to produce the plurality of simulated phase behavior data.

8. The method of claim 1, wherein the plurality of simulated phase behavior data comprises a plurality of phase diagrams representing phase behavior of one or more fluids in the hydrocarbon reservoirs.

9. The method of claim 1, wherein the library comprises a lookup table, and wherein accessing the library includes entering the pore size data, bulk fluid data and kerogen data corresponding to the actual hydrocarbon reservoir into the lookup table.

10. A non-transitory computer-readable medium having stored thereon a plurality of computer-executable instructions which, when executed by a computer, cause the computer to determine a phase behavior of a reservoir fluid disposed in an actual hydrocarbon reservoir, the computer-executable instructions include computer-executable instructions that:
receive a plurality of predetermined pore size data, a plurality of predetermined bulk fluid data, and a plurality of predetermined kerogen data that are based on historical data for a plurality of hydrocarbon reservoirs, wherein the computer-executable instructions which, when executed by a computer, cause the computer to receive the plurality of predetermined pore size data, the plurality of predetermined bulk fluid data, and the plurality of predetermined kerogen data, further comprise computer-executable instructions which, when executed by a computer, cause the computer to:
receive a first group of data composed of a first predetermined pore size data, a first predetermined kerogen data, and a first predetermined bulk fluid data; and
receive a second group of data composed of a second predetermined pore size data, a second predetermined kerogen data, and a second predetermined bulk fluid data;
create a computer-implemented library of a plurality of simulated phase behavior data for the predetermined pore size data, the predetermined bulk fluid data, and the predetermined kerogen data, wherein each of the plurality of simulated phase behavior data is stored in the library and is associated with a predetermined pore size data from among the plurality of predetermined pore size data, a predetermined bulk fluid data from among the plurality of bulk fluid data, and a predetermined kerogen data among the plurality of predetermined kerogen data, wherein the computer-executable instructions which, when executed by a computer, cause the computer to create the library of the plurality of simulated phase behavior data, further comprise computer-executable instructions which, when executed by a computer, cause the computer to:
perform a first computer simulation on the first group of data to produce a first phase diagram;
perform a second computer simulation on the second group of data to produce a second phase diagram; and
store the first phase diagram and the second phase diagram in the library;
determine the phase behavior of the reservoir fluid disposed in the actual hydrocarbon reservoir without performing a computer simulation on a pore size data, a bulk fluid data and a kerogen data corresponding to the actual hydrocarbon reservoir and using the library by accessing the library and matching the pore size data, the bulk fluid data and the kerogen data corresponding to the actual hydrocarbon reservoir with that of a simulated phase behavior data among the plurality of simulated phase behavior data stored in the created library; and
select a drawdown pressure for the actual hydrocarbon reservoir based on the determined phase behavior of the reservoir fluid in order to maximize a flow rate of the reservoir fluid;
wherein the pore size data corresponding to the actual hydrocarbon reservoir is an acquired pore size data, the bulk fluid data corresponding to the actual hydrocarbon reservoir is an acquired bulk fluid data, and the kerogen data corresponding to the actual hydrocarbon reservoir is an acquired kerogen data corresponding to the actual hydrocarbon reservoir; and
wherein the computer-executable instructions which, when executed by a computer, cause the computer to determine the phase behavior of the reservoir fluid, further comprise computer-executable instructions which, when executed by a computer, cause the computer to:
determine similarity of the acquired pore size data, the acquired bulk fluid data, and the acquired kerogen data to the first group of data and the second group of data; and
derive a phase diagram of the reservoir fluid by extrapolating the first group of data with the second group of data.

11. The non-transitory computer-readable medium of claim 10, wherein the computer-executable instructions which, when executed by a computer, cause the computer to determine the phase behavior of the reservoir fluid, further comprise computer-executable instructions which, when executed by a computer, cause the computer to determine that the phase behavior of the reservoir fluid corresponds to the first phase diagram by matching the acquired pore size data, the acquired bulk fluid data, and the acquired kerogen data to the first group of data.

12. A computer system, comprising:
a processor; and
a memory comprising a plurality of program instructions which, when executed by the processor, cause the processor to determine a phase behavior of a reservoir fluid disposed in an actual hydrocarbon reservoir, wherein the program instructions include program instructions that:
receive a plurality of predetermined pore size data, a plurality of predetermined bulk fluid data, and a plurality of predetermined kerogen data that are based on historical data for a plurality of hydrocarbon reservoirs, wherein the predetermined kerogen data comprises a composition of organic chemical compounds found in pore surfaces of at least one of the hydrocarbon reservoirs;

perform a plurality of computer simulations to create a computer-implemented library of a plurality of simulated phase behavior data for the predetermined pore size data, the predetermined bulk fluid data, and the predetermined kerogen data, wherein each of the plurality of simulated phase behavior data is stored in the library and is associated with a predetermined pore size data from among the plurality of predetermined pore size data, a predetermined bulk fluid data from among the plurality of bulk fluid data, and a predetermined kerogen data among the plurality of predetermined kerogen data;

determine the phase behavior of the reservoir fluid disposed in the actual hydrocarbon reservoir without performing a computer simulation on a pore size data, a bulk fluid data and a kerogen data corresponding to the actual hydrocarbon reservoir and using the library by accessing the library and matching the pore size data, the bulk fluid data and the kerogen data corresponding to the actual hydrocarbon reservoir with that of a simulated phase behavior data among the plurality of simulated phase behavior data stored in the created library; and select a drawdown pressure for the actual hydrocarbon reservoir based on the determined phase behavior of the reservoir fluid in order to maximize a flow rate of the reservoir fluid.

13. The computer system of claim 12, further comprising program instructions which, when executed by the processor, cause the processor to perform a plurality of molecular dynamic simulations on the predetermined pore size data, the predetermined bulk fluid data, and the predetermined kerogen data to produce the plurality of simulated phase behavior data.

* * * * *